(12) United States Patent
Saltsidis et al.

(10) Patent No.: US 8,705,534 B2
(45) Date of Patent: Apr. 22, 2014

(54) PROVIDER EDGE BRIDGE WITH REMOTE CUSTOMER SERVICE INTERFACE

(75) Inventors: Panagiotis Saltsidis, Stockholm (SE); Zhemin Ding, Stockholm (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 457 days.

(21) Appl. No.: 13/069,748

(22) Filed: Mar. 23, 2011

(65) Prior Publication Data
US 2012/0243435 A1  Sep. 27, 2012

Related U.S. Application Data

(63) Continuation of application No. PCT/IB2010/055149, filed on Nov. 12, 2010.

(60) Provisional application No. 61/260,925, filed on Nov. 13, 2009.

(51) Int. Cl.
  *H04L 12/28* (2006.01)
  *H04L 12/56* (2006.01)

(52) U.S. Cl.
  USPC .......................................... 370/392; 370/401

(58) Field of Classification Search
  None
  See application file for complete search history.

(56) References Cited

U.S. PATENT DOCUMENTS

2010/0158024 A1* 6/2010 Sajassi et al. ................ 370/401
2012/0027014 A1* 2/2012 Mack-Crane et al. ........ 370/390

OTHER PUBLICATIONS

Mack-Crane, 802.1Qbc Provider Bridging-Remote Customer Service Interface, Sep. 2009, all pages http://www.ieee802.org/1/files/public/docs2009/bc-mackcrane-RCSI-details-discussion-0909.pdf.*
Interworking Task Group of IEEE 802.1 : "Virtual Bridged Local Area Network—Amendment: Provider Bridging—Remote Customer Service Interfaces", IEEE Standard, IEEE, Piscataway, NJ, USA, Jun. 16, 2010, XP002624670, Retrieved from the Internet: http://ieeexplore.ieee.org/stamp/stamp.jsp?.
MEF Forum: "External Network Network Interfaces (ENNI)—Phase 1", The Metro Ethernet Forum, Jan. 31, 2010, XP002624871, Retrieved from the Internet: http://metroethernetforum.org/PDF_Documents/technicalspecifications/.
"IEEE Standard for Local and Metropolitan Area Networks—Virtual Bridged Local Area Networks. Amendment 4: Provider Bridges; IEEE Std 802.1 ad-2005 (Amendment to IEEE Std 8021 Q-2005)", IEEE Standard IEEE, Piscataway, NJ, USA, Jan. 1, 2006, pp. 1-60, XP017603886.

* cited by examiner

*Primary Examiner* — Marcus R Smith

(57) ABSTRACT

A method and Provider Edge Bridge for providing a Port-based interface. In one embodiment, the Provider Edge Bridge includes a Customer Virtual Local Area Network (C-VLAN) component; a first Service VLAN (S-VLAN) component connected to the C-VLAN component and to a Provider Bridged Network; and a second S-VLAN component connected to the C-VLAN component, to the first S-VLAN component, and to customer equipments. In another embodiment, the Provider Edge Bridge includes the C-VLAN component and a single S-VLAN component connected to the C-VLAN component, to the Provider Bridged Network, and to the customer equipments. In both embodiments, the Provider Edge Bridge is configured to provide the Port-based interface without utilizing a S-VLAN mapping component.

4 Claims, 10 Drawing Sheets

US 8,705,534 B2

PROVIDER EDGE BRIDGE WITH REMOTE CUSTOMER SERVICE INTERFACE

RELATED APPLICATIONS

This application is a continuation of International Application No. PCT/IB2010/055149 filed on Nov. 12, 2010, which claimed the benefit of U.S. Provisional Application No. 61/260,925 filed Nov. 13, 2009, the disclosures of which are fully incorporated herein by reference.

TECHNICAL FIELD

The present invention relates generally to communication systems, and more particularly, to a system and method for providing a remote customer service interface in a Provider Edge Bridge.

BACKGROUND

The Metro Ethernet Forum specifies the services provided by the Metro Ethernet Network (MEN), the interfaces to the MEN, and the attributes that characterize the services and interfaces.

FIG. 1 is a simplified block diagram of a MEN 11 illustrating a plurality of User Network Interfaces A-C (UNIs) 12a-12c between the MEN and Customer Equipments (CEs) 13a-13c. If the MEN is implemented with 802.1 technology, the MEN is equivalent to a Provider Bridged Network (802.1ad). As shown in FIG. 1, each UNI is a demarcation between the MEN and a CE. The frame format at the UNI is an untagged or C-tagged Ethernet frame. UNIs provide a Port-based and C-tagged service interface. An Ethernet Virtual Connection (EVC) is an association of UNIs such that any ingress customer frame mapped to an EVC at a UNI may be delivered to any or all other UNIs that have mappings to the same EVC. FIG. 1 illustrates two EVCs. EVC-1 associates UNI A and UNI B, and EVC-2 associates UNI A, UNI B, and UNI C. For a Provider Bridged Network, the EVC is a service instance implemented by a Service Virtual Local Area Network (S-VLAN) and identified by an S-VLAN Identifier (S-VID).

FIG. 2 is a simplified block diagram of two Operator MENs 21 and 22 connected by an External Network Network Interface (E-NNI) 23. In the MEF model, there is a Service Provider responsible for the end-to-end service offered to a customer. The Service Provider may contract with one or more Operators, each responsible for a MEN, to realize the service. The Service Provider may (or may not) be one of the Operators. The E-NNI is a reference point representing the boundary between two Operator MENs that are operated as separate administrative domains.

The physical medium at the E-NNI 23 is a full-duplex 802.3 LAN. The frame format at the E-NNI is an S-tagged 802.3 frame. The S-VID is a service identifier that enables the operator on either side of the E-NNI to map frames to the appropriate Operator Virtual Connection (OVC) End Point.

An EVC 24 is an end-to-end (UNI-to-UNI) service instance. An OVC is a local (to one Operator MEN) service instance. FIG. 2 illustrates a first OVC 25 for MEN 21 and a second OVC 26 for MEN 22. In many cases there is a one-to-one relationship within a given Operator MEN between an OVC and an EVC; however this is not true in all cases. The arrows at the bottom of FIG. 2 provide a simple example to illustrate the OVCs 25 and 26 and the EVC 24.

FIG. 3 is a simplified block diagram of two Operator MENs 31 and 32 in which a service provider provides a multipoint EVC to a customer. The MENs are connected by E-NNI 33.

Under certain circumstances, a service provider may not want to disclose or delegate to other operators any details of the service being provided to the customer. The service provider may provide multipoint service to customers but only purchase point-to-point OVCs from another operator's MEN. In the example shown in FIG. 3, Service Provider A provides a multipoint EVC to a customer with sites UNI A 34a, UNI B 34b, UNI E 34e, and UNI D 34d. Service Provider A also owns MEN A 31 (i.e., Service Provider A is also MEN A's Operator). To keep the customer information secret and reduce the operation cost, Service Provider A only buys two point-to-point OVCs from the Operator of MEN B 32.

A problem arises when a frame is sent from UNI E 34e with the destination of UNI D 34d. Because Service Provider A only uses two point-to-point OVCs from MEN B 32, this frame needs to be received by MEN A 31 at a port of the E-NNI 33 and be transmitted on the same physical port to UNI D 34d with a different S-VID. This process is referred to as "hairpin switching" and is not supported by current Provider Edge Bridges.

FIG. 4 is a simplified block diagram of two Operator MENs 41 and 42 in which a service provider provides services to a customer located in another operator's MEN in a process similar to the "hairpin switching" of FIG. 3. The MENs are connected by E-NNI 43. Service Provider A provides two (or more) EVCs to UNI D 44d, which is located in MEN B. Service Provider A owns MEN A but not MEN B. The straightforward solution shown in FIG. 4 is for Service Provider A to obtain an OVC per EVC from Operator B and have Operator B perform the service multiplexing functionality.

However, Service Providers may not like this solution for several reasons. First, it requires Service Provider A to buy multiple OVCs from Operator B and disclose the details of its customer information. Second, Service Provider A must coordinate with Operator B whenever there is a change of services such as the number of EVCs provided to UNI D.

FIG. 5 is a simplified block diagram of two Operator MENs 51 and 52 in which a Virtual UNI (VUNI) 53 on the MEN A side of the E-NNI 54 performs service multiplexing and other UNI functions. If the MEN uses 802.1 technology, implementing the VUNI at the E-NNI requires a de-multiplexing function to first de-multiplex frames received at the E-NNI based on the S-VID, and then perform the normal Provider Edge Bridge function of mapping frames to EVCs based on the Customer VLAN Identifier (C-VID). The VUNI is not supported by current Provider Edge Bridges.

FIG. 6 is a simplified block diagram of an existing Provider Edge Bridge Model 61. In 802.1ad (Provider Bridging), a new Service VLAN tag is defined for use in provider networks. So the bridges at the edge of a Provider Bridged Network need to operate on both Customer VLAN (C-VLAN) tags and Service VLAN (S-VLAN) tags. A Provider Edge Bridge contains at least one C-VLAN component 62 (one per customer) with an internal connection per service instance to an S-VLAN component 63. The C-VLAN component includes a Customer Edge Port (CEP) 64 that is connected to customer-owned equipment and receives and transmits frames for a single customer. The C-VLAN component also includes at least one Provider Edge Port (PEP) 65 that connects to a Customer Network Port (CNP) 66 on the S-VLAN component and receives and transmits frames for a single customer. The S-VLAN component includes at least one CNP that receives and transmits frames for a single customer. The S-VLAN component also includes a Provider Network Port (PNP) 67 that can transmit and receive frames for multiple customers.

FIG. 7 is a simplified block diagram of a Provider Edge Bridge Model 71 proposed in IEEE 802.1Qbc/D0.0 to address the "Hairpin Switching" and "VUNI" problems in Provider Bridged Networks. Multiple remote customer service interfaces can be provided over a LAN interconnecting two Provider Bridged Networks through the use of an S-VLAN mapping component 72 as shown in FIG. 7.

The model specifies that the S-VLAN mapping component 72 relays frames between a common port (e.g., PNP in the S-VLAN mapping component 72) and a set of (internal) LANs 73, where each internal LAN provides a remote customer service interface 74 associated with a single service VID. The S-VLAN mapping component 72 is a limited function S-VLAN component that relays frames between one S-VLAN-tagged external LAN and the set of internal LANs each of which provides a single service interface. Frames belonging to a Remote Customer Service Interface (R-CSI) are identified by a unique service VID and are mapped to and from a distinct internal LAN.

An R-CSI may connect to a C-VLAN component 75 to provide a C-tagged service interface (i.e., to provide VUNI) or may be directly connected to the Provider Bridge's S-VLAN component 76 to provide a Port-based interface (i.e., to provide Hairpin Switching). One internal LAN 77 may provide an S-tagged service interface between the PBNs, and multiple service VIDs may be mapped to this interface. It is connected directly to the Provider Bridge's S-VLAN component 76 and provides an S-tagged service interface.

The problem with the existing remote customer service interface (R-CSI) solution is that it requires the new S-VLAN Mapping component 72. This requires additional new hardware to support the new functionalities and the standardized C-VLAN component 62 and S-VLAN component 63 cannot be reused. Thus, the solution is expensive and undesirable.

SUMMARY

The present invention provides a system and method for providing a remote customer service interface in a Provider Edge Bridge. The invention takes advantage of the flexibility of the construction of the VLAN component in order to reuse the C-VLAN and S-VLAN components to support the Hairpin Switching and VUNI functions. In a first embodiment, the existing VLAN component is utilized to provide the functions. Instead of using the S-VLAN mapping component, the invention adds an S-VLAN component with a particular configuration. In a second embodiment, the Provider Edge Bridge architecture is utilized without adding any new functional component. A new port function is integrated into a single S-VLAN component in an otherwise off-the-shelf Provider Edge Bridge.

In one embodiment, the present invention is directed to a method of configuring a Provider Edge Bridge in a Provider Bridged Network to provide a Virtual C-tagged User Network Interface, VUNI, service interface without utilizing a Service Virtual Local Area Network, S-VLAN, mapping component. The Provider Edge Bridge includes a Customer VLAN, C-VLAN, component having a Customer Edge Port, CEP, and a plurality of Provider Edge Ports, PEPs. The Provider Edge Bridge is connected through a first S-VLAN component to a Metro Ethernet Network, MEN, and is connected through a second S-VLAN component to an External Network Network Interface, E-NNI. The method includes the steps of designating as S-VLAN Remote Customer Ports, RCPs, a plurality of ports on the first S-VLAN component facing the MEN when the ports are connecting internal services in the MEN to provide the VUNI service interface to customers from a far side of the E-NNI; configuring by the RCPs, a set of S-VLAN Identifiers, S-VIDs, to be treated as a VUNI type of Remote Customer Service Interface, R-CSI; and configuring by the RCPs, an S-VID merging table identifying the set of S-VIDs in the MEN to be merged into a single tunneled S-VLAN service in the E-NNI. The method also includes the steps of assigning a distinct Customer Network Port, CNP, on the first S-VLAN component to each of the configured S-VIDs; configuring a plurality of CNPs on the first S-VLAN component one-to-one to a set of the PEPs on the C-VLAN component according to the S-VID merging table; configuring the CEP on the C-VLAN component to connect to a CNP on the second S-VLAN component; and configuring a Provider Network Port, PNP, facing the E-NNI on the second S-VLAN component with the S-VID for the single tunneled S-VLAN service. In this way, the Provider Edge Bridge is configured to provide the VUNI service interface without utilizing the S-VLAN mapping component.

In another embodiment, the present invention is directed to a method of configuring a Provider Edge Bridge in a Provider Bridged Network to provide a Hairpin Switching service interface without utilizing an S-VLAN mapping component. The Provider Edge Bridge is connected through a first S-VLAN component to a MEN, and is connected through a second S-VLAN component to an E-NNI. The method includes the steps of designating as RCPs, a plurality of ports on the first S-VLAN component facing the MEN when the ports are connecting internal services in the MEN to provide the Hairpin Switching service interface to customers from a far side of the E-NNI; configuring by the RCPs, a set of S-VIDs to be treated as a Hairpin Switching type of R-CSI; and configuring by the RCPs, an S-VID Hairpin Switching table in which an S-VID inside the MEN is split to a number of S-VLAN services in the E-NNI. The method also includes the steps of assigning a distinct CNP on the first S-VLAN component to each of the configured S-VIDs; configuring a plurality of CNPs on the first S-VLAN component to have the same S-VID according to the S-VID Hairpin Switching table; configuring CNPs on the first S-VLAN component to connect to CNPs on the second S-VLAN component; and configuring the CNPs and the PNP on the second S-VLAN component with different S-VIDs to split the S-VID inside the MEN according to the Hairpin Switching table. In this way, the Provider Edge Bridge is configured to provide the Hairpin Switching service interface without utilizing the S-VLAN mapping component.

In another embodiment, the present invention is directed to a method of configuring a Provider Edge Bridge in a Provider Bridged Network to provide a VUNI service interface without utilizing an S-VLAN mapping component. In this embodiment, the Provider Edge Bridge is connected through RCPs on an S-VLAN component to a MEN, and is connected through a PNP on the same S-VLAN component to an E-NNI. The method includes the steps of designating as the RCPs, a plurality of S-VLAN ports facing the MEN when the ports are connecting internal services in the MEN to provide the VUNI service interface to customers from a far side of the E-NNI; configuring by the RCPs, a set of S-VIDs to be treated as a VUNI type of R-CSI; and configuring by the RCPs, an S-VID merging table identifying the set of S-VIDs in the MEN to be merged into a single tunneled S-VLAN service in the E-NNI. The method also includes the steps of assigning a distinct CNP on the S-VLAN component to each of the configured S-VIDs; configuring a plurality of CNPs on the S-VLAN component one-to-one to a set of the PEPs on the C-VLAN component according to the S-VID merging table; and configuring the PNP on the S-VLAN component facing the E-NNI with the same S-VID for the tunneled service. In this way, the Provider Edge Bridge is configured to provide the VUNI service interface without utilizing the S-VLAN mapping component.

In another embodiment, the present invention is directed to a method of configuring a Provider Edge Bridge in a Provider Bridged Network to provide a Hairpin Switching service interface without utilizing an S-VLAN mapping component. Again in this embodiment, the Provider Edge Bridge is connected through RCPs on an S-VLAN component to a MEN, and is connected through a PNP on the same S-VLAN component to an E-NNI. The method includes the steps of designating as the RCPs, a plurality of S-VLAN ports facing the MEN when the ports are connecting internal services in the MEN to provide the Hairpin Switching service interface to customers from a far side of the E-NNI; configuring by the RCPs, a set of S-VIDs to be treated as a Hairpin Switching type of R-CSI; and configuring by the RCPs, an S-VID Hairpin Switching table in which an S-VID inside the MEN is split to a number of S-VLAN services in the E-NNI. The method also includes the steps of assigning a distinct CNP on the S-VLAN component to each of the configured S-VIDs; configuring a plurality of CNPs on the S-VLAN component to have the same S-VID according to the S-VID Hairpin Switching table; configuring CNPs on the S-VLAN component to connect to other CNPs on the same S-VLAN component; and configuring the CNPs and the PNP on the S-VLAN component with different S-VIDs to split the S-VID inside the MEN according to the Hairpin Switching table. In this way, the Provider Edge Bridge is configured to provide the Hairpin Switching service interface without utilizing the S-VLAN mapping component.

In another embodiment, the present invention is directed to a Provider Edge Bridge for providing a VUNI service interface or a Hairpin Switching service interface. The Provider Edge Bridge includes a C-VLAN component having a CEP and a plurality of PEPs; a first S-VLAN component connected to the C-VLAN component and to a MEN; and a second S-VLAN component connected to the C-VLAN component, to the first S-VLAN component, and to an E-NNI. The Provider Edge Bridge is configured to provide the VUNI service interface or the Hairpin Switching service interface without utilizing an S-VLAN mapping component.

In another embodiment, the present invention is directed to a Provider Edge Bridge for providing a VUNI service interface or a Hairpin Switching service interface. The Provider Edge Bridge includes a C-VLAN component having a CEP and a plurality of PEPs; and a single S-VLAN component connected to the C-VLAN component, to the MEN, and to the E-NNI. The Provider Edge Bridge is configured to provide the VUNI service interface or the Hairpin Switching service interface without utilizing an S-VLAN mapping component.

The present invention solves the problem with the existing remote customer service interface (R-CSI) solution because it does not require the S-VLAN Mapping component. The present invention can be implemented in existing Provider Edge Bridges without adding new hardware to support the new functionalities by configuring standardized C-VLAN and S-VLAN components and their ports in a new way.

DETAILED DESCRIPTION

Figure 8:
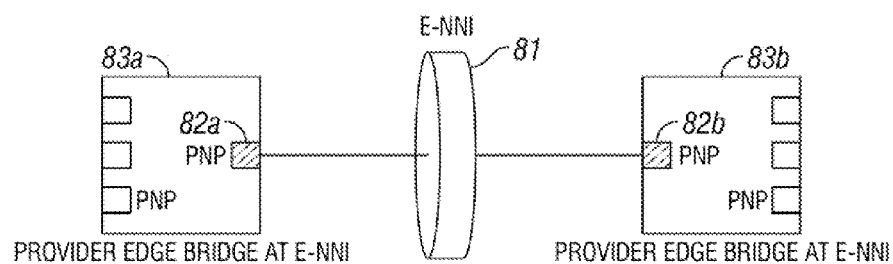
FIG. 8 is a simplified block diagram of an ENNI implemented between two Provider Network Ports (PNPs)

FIG. 8 is a simplified block diagram of an existing ENNI 81 implemented between two PNPs 82a and 82b on two Provider Edge Bridges 83a and 83b. In 802.1ad, the E-NNI is provided by a PNP, which is located on an S-VLAN component providing an S-tagged service interface. This cannot provide the type of interface required for VUNI or Hairpin Switching.

In a first embodiment of the present invention, the existing VLAN component is utilized to provide the functions. Instead of using the S-VLAN mapping component, the invention adds an S-VLAN component to the Provider Edge Bridge at the E-NNI to provide Hairpin switching and VUNI. There is no need to introduce an R-CSI as a new Bridge component.

Figure 9:
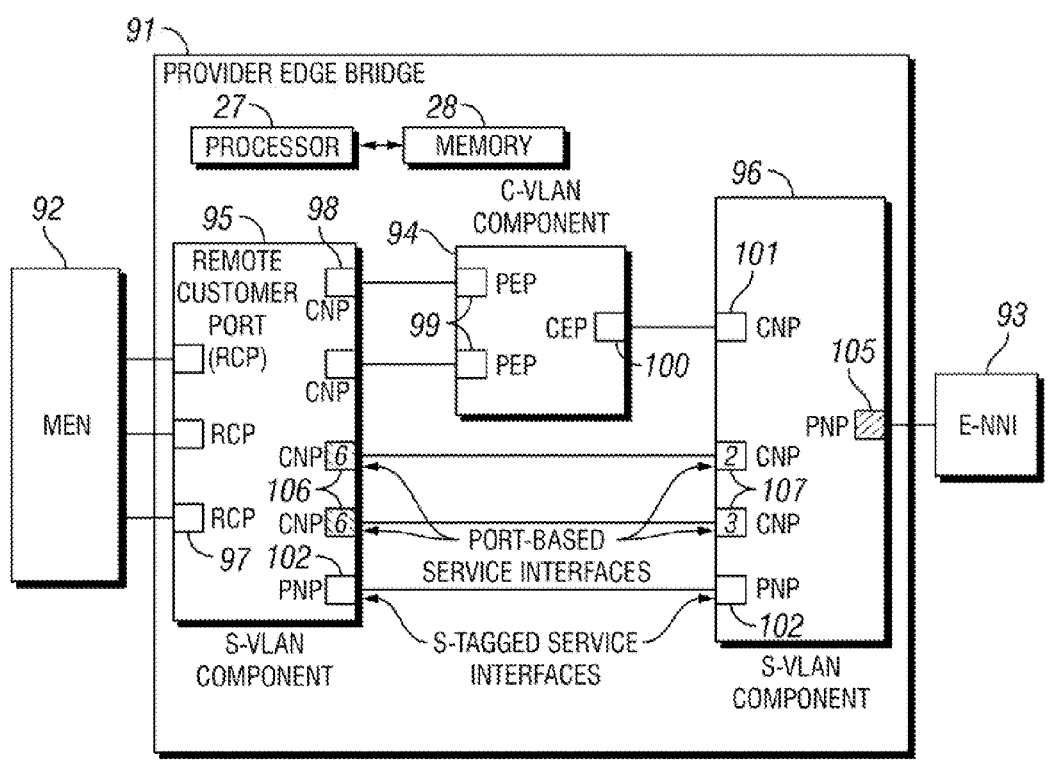
FIG. 9 is a simplified block diagram of a first exemplary embodiment of a Provider Edge Bridge of the present invention.

FIG. 9 is a simplified block diagram of a first exemplary embodiment of a Provider Edge Bridge 91 of the present invention. The Provider Edge Bridge is shown connected to a MEN 92 on the left side and an E-NNI 93 on the right side. The Provider Edge Bridge includes a C-VLAN component 94 and two S-VLAN components, a left S-VLAN component 95 and a right S-VLAN component 96.

Figure 1:
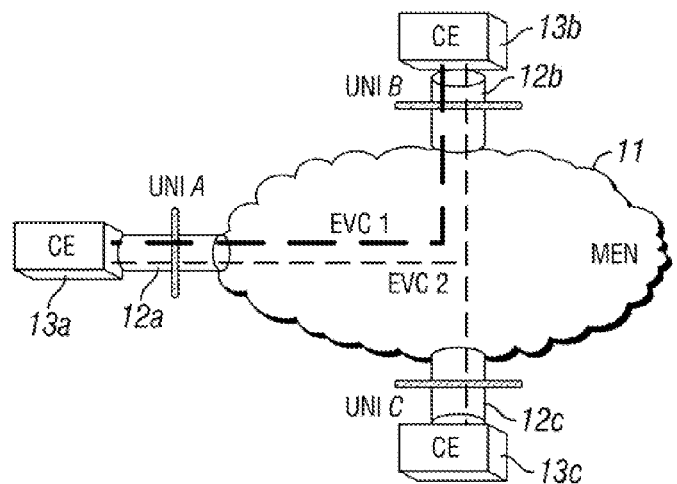
FIG. 1 is a simplified block diagram of a MEN illustrating User Network Interfaces (UNIs) between the MEN and Customer Equipments (CEs)
Figure 2:
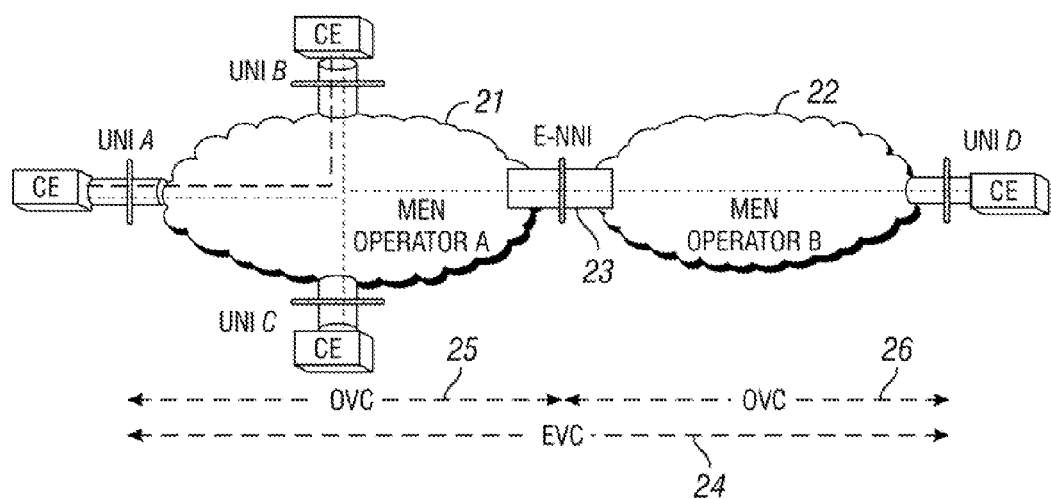
FIG. 2 is a simplified block diagram of two Operator MENs connected by an External Network Network Interface (E-NNI)
Figure 3:
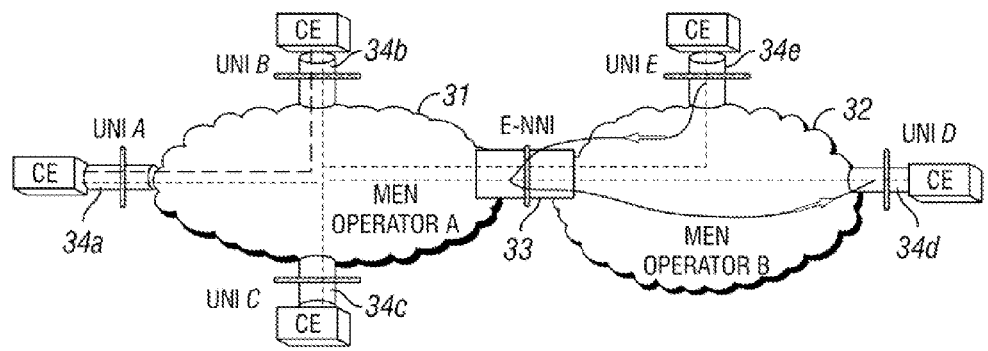
FIG. 3 is a simplified block diagram of two Operator MENs in which a service provider provides a multipoint EVC to a customer.
Figure 4:
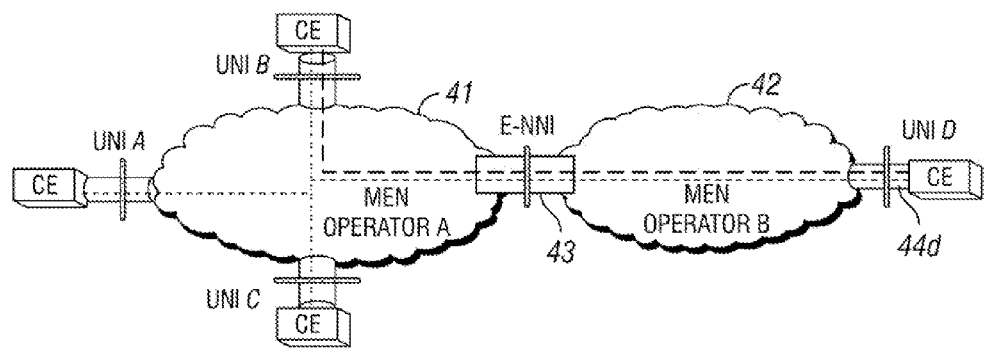
FIG. 4 is a simplified block diagram of two Operator MENs in which a service provider provides services to a customer located in another operators MEN.
Figure 5:
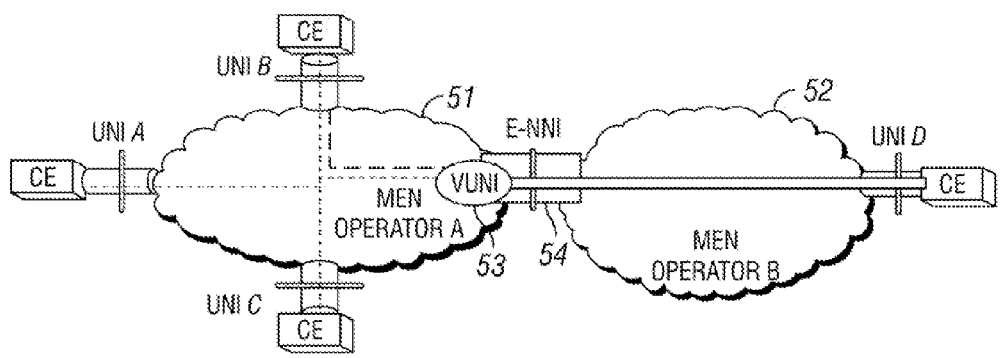
FIG. 5 is a simplified block diagram of two Operator MENs in which a Virtual UNI (VUNI) on the MEN A side of the E-NNI performs service multiplexing and other UNI functions.
Figure 6:
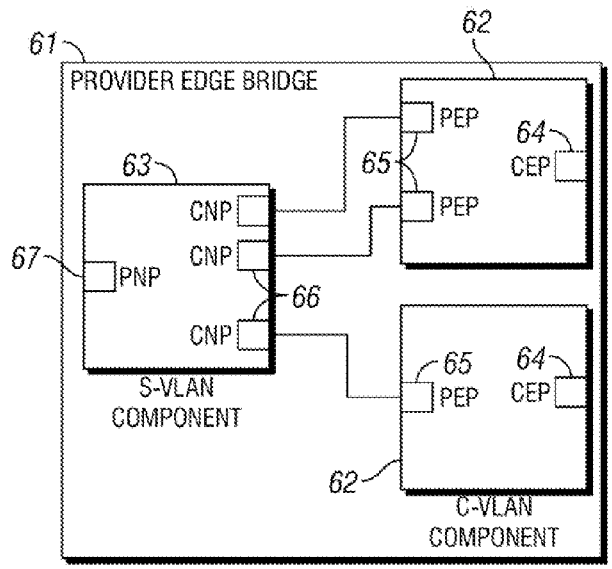
FIG. 6 is a simplified block diagram of a Provider Edge Bridge Model.
Figure 7:
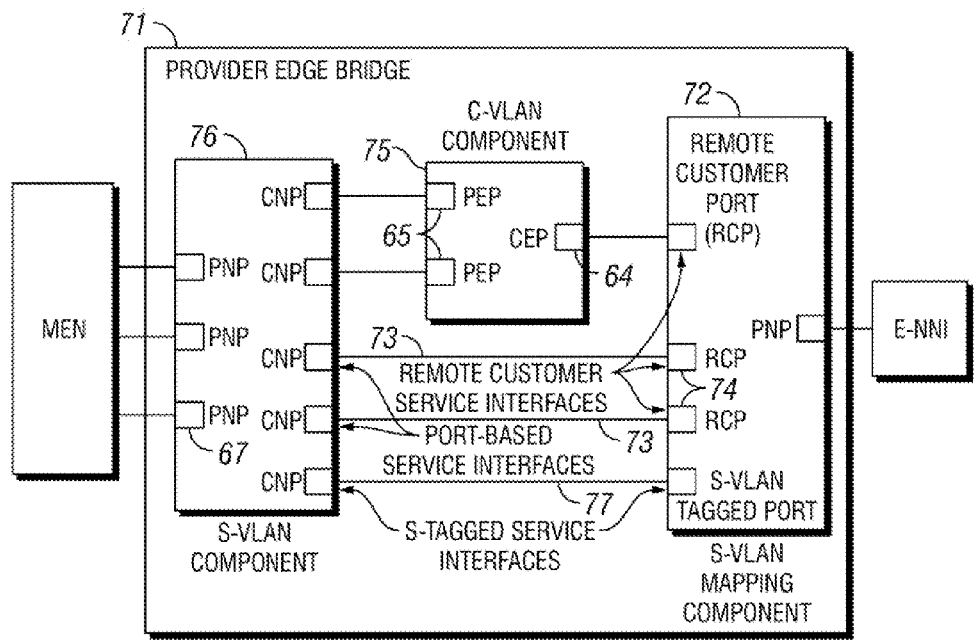
FIG. 7 is a simplified block diagram of a proposed Provider Edge Bridge Model to address the "Hairpin Switching" and "VUNI" problems in Provider Bridged Networks.

The invention provides functionality similar to the Provider Edge Bridge Model 71 of FIG. 7 without adding the new S-VLAN Mapping component 72. In general, a customer service interface should be associated with an external port that enables access to a specific service for the customer that is directly connected to it. In the case of the R-CSI, the "customer" is in practice, the entity located in the MEN and the traffic from the MEN is treated as incoming customer traffic. Correspondingly, the customer service interface in this embodiment of the present invention is associated with the ports facing the MEN 92 (and not the "E-NNI" PNP(s)). In the invention, the functionality provided by the S-VLAN ports facing the MEN (built by a combination of S-(C)-S components) is different than that of the ports (PNPs) on a system built by bare S-VLAN components. Therefore, the S-VLAN ports facing the MEN are identified herein as "Remote Customer Ports (RCPs)" 97. This enables an easy identification of these ports for management purposes.

In principle, the RCPs 97 provide two different types of R-CSI: (1) a Virtual C-tagged (VUNI) service interface, and (2) a Hairpin Switching service interface, plus an S-tagged service interface based on the S-VID of the incoming frames.

The functionality associated with the internal ports is the same as the description of the same set of ports in Sections 15.3 and 15.4 of "Virtual Bridged Local Area Networks, Amendment 4: Provider Bridges", 2005 and is summarized below:

CNPs 98, 101, 106, and 107 provide access to a single service instance (S-VID), allow only untagged frames to be received, and have a PVID of the same value as the supported service instance.

PEPs 99 provide access only to customer service instances (C-VIDs) that are associated with a specific provider service instance.

CEPs 100 provide access to all customer service instances to which each PEP on the same C-VLAN component 94 provides access.

PNPs 102 transmit and receive frames for multiple customers.

The general configuration of the Provider Edge Bridge 91 is achieved as follows:

1. Designate the ports (formerly PNPs) facing the MEN as RCPs 97 for management purposes if those ports are connecting the internal services in the MEN 92 to provide VUNI or Hairpin Switching service interfaces to customers from the other side of the E-NNI 93.

2. Enable the following management actions on the RCPs 97:

2.1. Configuration of an R-CSI type table that provides the assignment of S-VIDs to R-CSI types enabling identification of the R-CSI type based on the S-VID of the incoming frames. Three R-CSI types should be possible: (1) the Virtual C-tagged (VUNI) R-CSI service interface, (2) the Hairpin Switching R-CSI service interface, and (3) the S-tagged service interface. An exemplary R-CSI type table is shown below

| R-CSI Type Table | |
|---|---|
| R-CSI type | S-VID |
| Virtual C-tagged R-CSI service interface | 1, 2 |
| Hairpin Switching R-CSI service interface | 3, 4 |
| S-tagged service interface | 5, 6, 7, 8 |

2.2. Configuration of an S-VID merging table in the case of a VUNI service interface, where all the customer C-VLAN services transported by a number of S-VLAN services inside the MEN 92 are merged to the same tunneled S-VLAN service in the E-NNI 93. An exemplary S-VID merging table is shown below.

| S-VID Merging Table | |
|---|---|
| Incoming S-VID from RCP (VUNI) | Outgoing S-VID to E-NNI |
| 1, 2 | 9 |

2.3. Configuration of an S-VID Hairpin Switching table in the case of a Hairpin Switching service interface, where an S-VLAN service inside the MEN 92 is split to a number of S-VLAN services in the E-NNI 93. An exemplary S-VID Hairpin Switching table is shown below.

| S-VID Hairpin Switching Table | |
|---|---|
| Incoming S-VID from RCP (Hairpin) | Outgoing S-VID to E-NNI |
| 3 | 10, 11 |
| 4 | 12, 13 |

3. Configure the CNPs, PEPs, and PNPs in the C-VLAN component 94 and the S-VLAN components 95 and 96 in a standard way.

Note that no special configuration is required for an RCP providing an S-tagged service interface as can be seen in FIG. 9. It can support multiple S-VLANs transferring S-VLAN tagged frames.

The operation of the Provider Edge Bridge 91 may be controlled by a processor or microprocessor 103 executing computer program instructions stored on a memory 104. The memory, or a different memory, may also be used to store the R-CSI type table, the S-VID merging table, and/or the S-VID Hairpin Switching table. The tables may be configured, for example, by a system operator through a Network Management System (NMS) (not shown) connected to the Provider Edge Bridge. The operation of the Provider Edge Bridge 91 will be described with reference to FIGS. 10 and 11.

Figure 10:
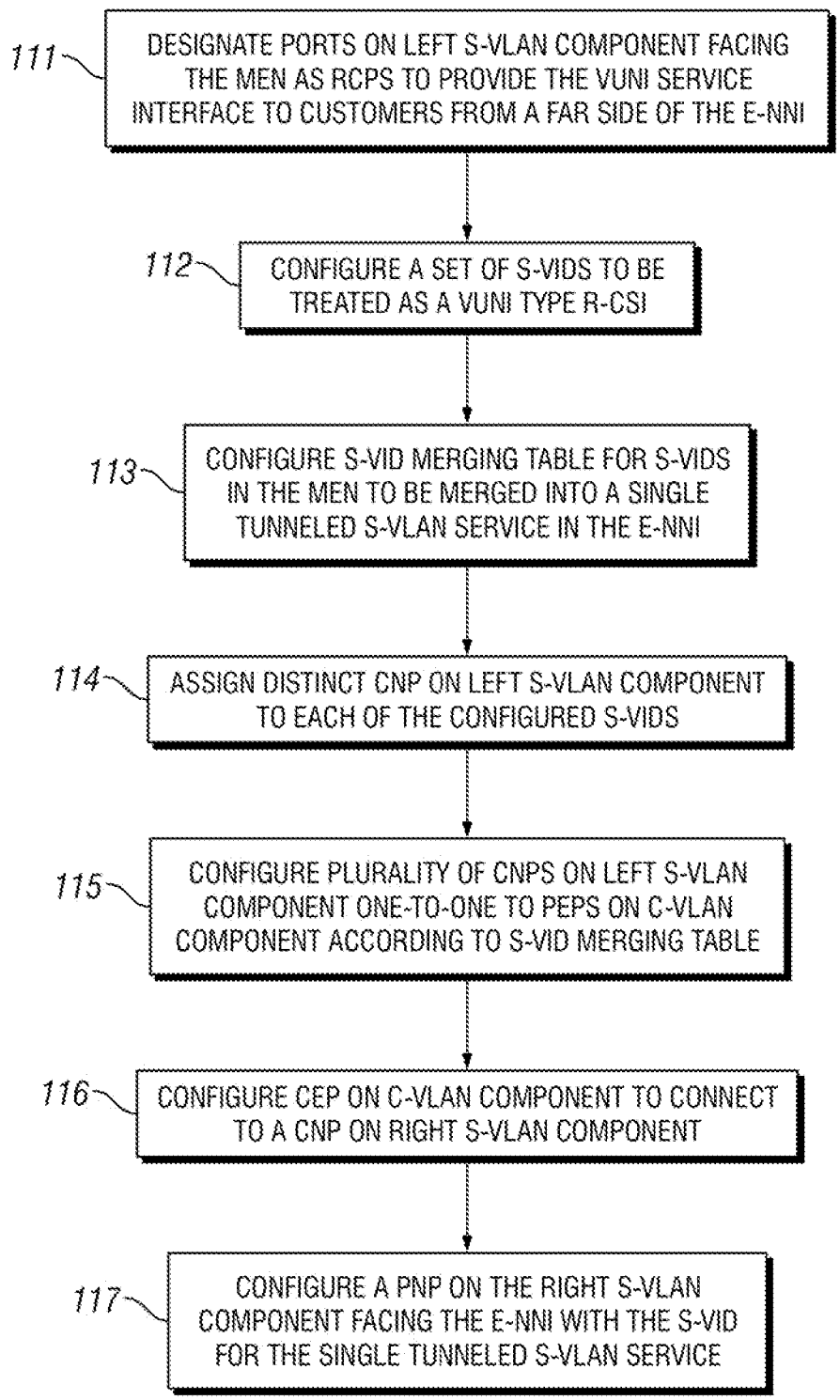
FIG. 10 is a flow chart illustrating the steps of a method of providing a Virtual C-tagged (VUNI) service interface utilizing the Provider Edge Bridge of FIG. 9.

FIG. 10 is a flow chart illustrating the steps of a method of providing a Virtual C-tagged (VUNI) service interface utilizing the Provider Edge Bridge 91 of FIG. 9. At step 111, the ports on the left S-VLAN component 95 facing the MEN 92 are designated as RCPs for management purposes if those ports are connecting the internal services in the MEN to provide a VUNI service interface to customers from the other side of the E-NNI 93. At step 112, a management action is enabled on the RCPs to configure a set of S-VIDs to be treated as R-CSI type: Virtual C-tagged (VUNI) service interface. At step 113, a management action is enabled on the RCPs to configure the S-VID merging table: the set of S-VIDs from the MEN to be merged into the same tunneled S-VLAN service in the E-NNI. At step 114, a distinct CNP on the left S-VLAN component 95 is assigned to each of the configured S-VIDs (configured in step 112).

At step 115, the CNPs on the left S-VLAN component 95 are configured one-to-one to a set of PEPs residing on one C-VLAN component according to the S-VID merging table (configured in step 113). For example, in FIG. 9, two GNPs 98 on the left S-VLAN component 95 are connected to two PEPs 99 on the C-VLAN component 94. At step 116, the CEP 100 on the C-VLAN component 94 is configured to connect to a CNP 101 on the right S-VLAN component 96. Finally, at step 117, the PNP 105 facing the E-NNI 93 on the right S-VLAN component 96 is configured with the same S-VID for the tunneled service.

Figure 11:
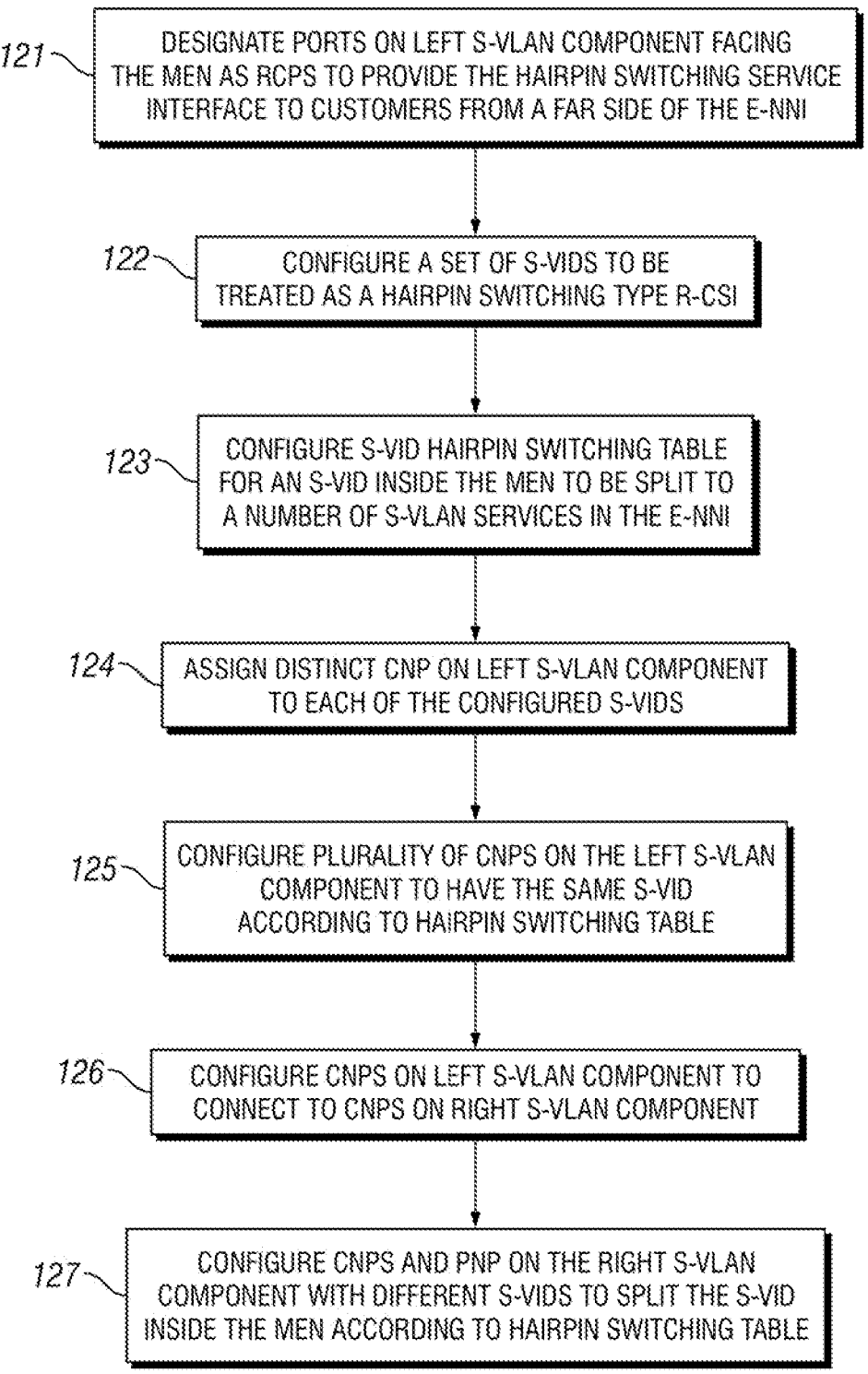
FIG. 11 is a flow chart illustrating the steps of a method of providing a Hairpin Switching service interface utilizing the Provider Edge Bridge of FIG. 9.

FIG. 11 is a flow chart illustrating the steps of a method of providing a Hairpin Switching service interface utilizing the Provider Edge Bridge 91 of FIG. 9. At step 121, the ports on the left S-VLAN component 95 facing the MEN 92 are designated as RCPs for management purposes if those ports are connecting the internal services in the MEN to provide a Hairpin Switching service interface to customers from the other side of the E-NNI 93. At step 122, a management action is enabled on the RCPs to configure a set of S-VIDs to be treated as R-CSI type: Hairpin Switching R-CSI service interface. At step 123, a management action is enabled on the RCPs to configure the S-VID Hairpin Switching table: the S-VID inside the MEN 92 is split to a number of S-VLAN services in the E-NNI 93. At step 124, a distinct CNP on the left S-VLAN component is assigned to each of the configured S-VIDs (configured in step 122).

At step 125, CNPs on the left S-VLAN component 95 are configured with the same VID according to the S-VID Hairpin Switching table (configured in step 123). For example, in FIG. 9, two CNPs 106 are configured as VID 6. At step 126, the CNPs on the left S-VLAN component 95 are configured to connect to CNPs on the right S-VLAN component 96. For example, in FIG. 9, the two GNPs 106 with VID 6 on the left S-VLAN component are connected to CNPs 107 with VID 2 and 3 on the right S-VLAN component. Finally, at step 127, CNPs 107 and the PNP 105 on the right S-VLAN component are configured with different S-VIDs to split the S-VID inside the MEN 92 according to the Hairpin Switching table.

Figure 12:
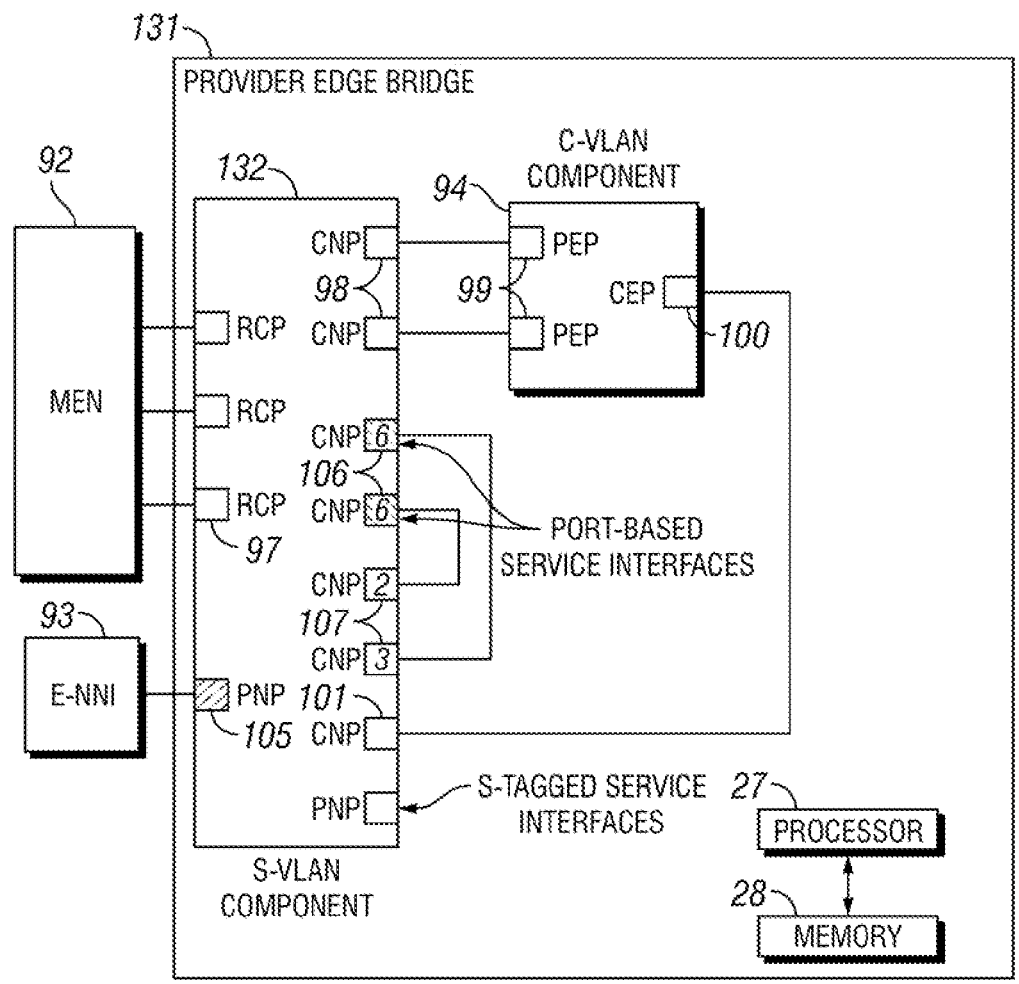
FIG. 12 is a simplified block diagram of a second exemplary embodiment of a Provider Edge Bridge of the present invention.

FIG. 12 is a simplified block diagram of a second exemplary embodiment of a Provider Edge Bridge 131 of the present invention. The Provider Edge Bridge is shown connected to the MEN 92 and the E-NNI 93. The Provider Edge Bridge includes the C-VLAN component 94, which is similar to the C-VLAN component of FIG. 9. In this embodiment, however, the two S-VLAN components 95 and 96 of FIG. 9 are merged into a single S-VLAN component 132. This configuration of a Provider Edge Bridge essentially provides the same functions as in FIG. 9. It matches perfectly the existing Provider Edge Bridge model, which means an off-the-shelf Provider Edge Bridge can be modified/configured to provide Hairpin Switching and VUNI without adding additional components.

The operation of the Provider Edge Bridge 131 may be controlled by a processor or microprocessor 103 executing computer program instructions stored on a memory 104. The memory, or a different memory, may also be used to store the R-CSI type table, the S-VID merging table, and/or the S-VID Hairpin Switching table. The tables may be configured, for example, by a system operator through an NMS (not shown) connected to the Provider Edge Bridge. The operation of the Provider Edge Bridge 131 will be described with reference to FIGS. 13 and 14.

Figure 13:
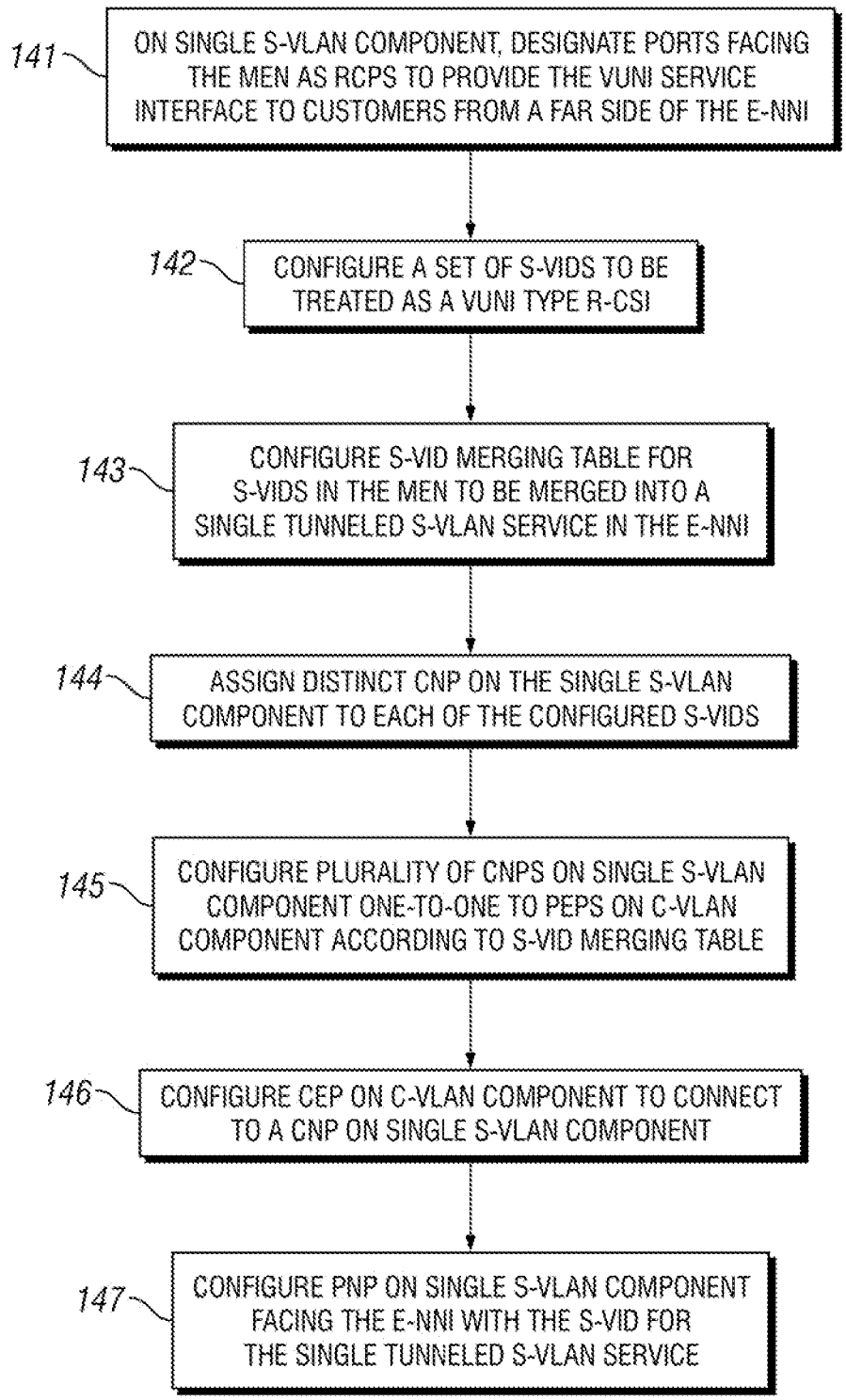
FIG. 13 is a flow chart illustrating the steps of a method of providing a VUNI service interface utilizing the Provider Edge Bridge of FIG. 12.

FIG. 13 is a flow chart illustrating the steps of a method of providing a VUNI service interface utilizing the Provider Edge Bridge 131 of FIG. 12. At step 141, the ports on the single S-VLAN component 132 facing the MEN 92 are designated as RCPs for management purposes if those ports are connecting the internal services in the MEN 92 to provide a VUNI service interface to customers from the other side of the E-NNI 93. At step 142, a management action is enabled on the RCPs to configure a set of S-VIDs to be treated as R-CSI type: Virtual C-tagged (VUNI) service interface. At step 143, a management action is enabled on the RCPs to configure the S-VID merging table: the set of S-VIDs from the MEN to be merged into the same tunneled S-VLAN service in the E-NNI. At step 144, a distinct CNP on the S-VLAN component 132 is assigned to each of the configured S-VIDs (configured in step 142).

At step 145, CNPs on the single S-VLAN component 132 are configured one-to-one to a set of PEPs residing on one C-VLAN component according to the S-VID merging table (configured in step 143). For example, in FIG. 10, two CNPs 98 on the S-VLAN component 132 are connected to two PEPs 99 on the C-VLAN component 94. At step 146, the CEP 100 on the C-VLAN component 94 is configured to connect to the CNP 101 on the S-VLAN component 132. Finally, at step 147, the PNP 105 facing the E-NNI 93 on the S-VLAN component is configured with the same S-VID for the tunneled service.

Figure 14:
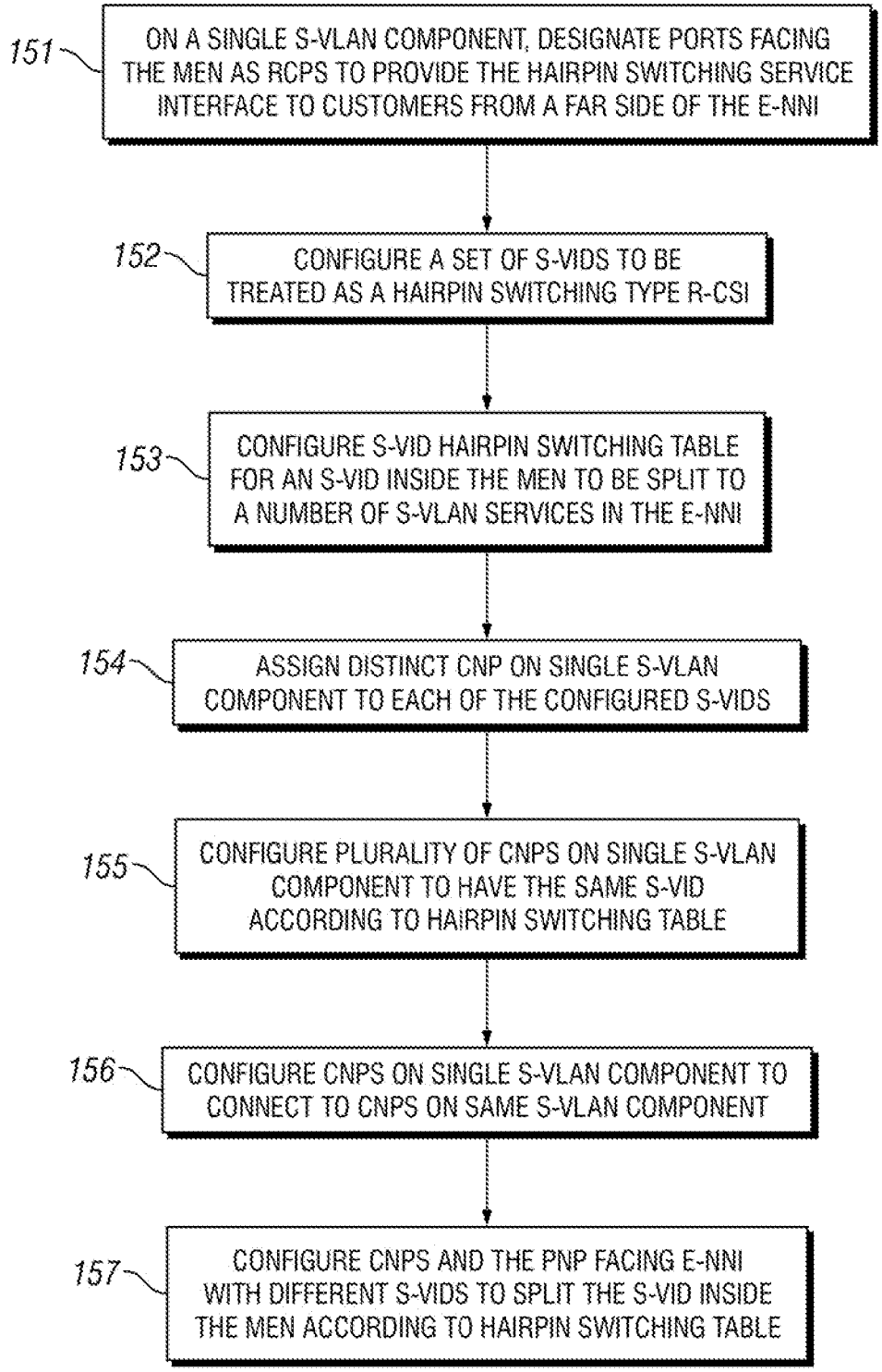
FIG. 14 is a flow chart illustrating the steps of a method of providing a Hairpin Switching service interface utilizing the Provider Edge Bridge of FIG. 12.

FIG. 14 is a flow chart illustrating the steps of a method of providing a Hairpin Switching service interface utilizing the Provider Edge Bridge of FIG. 12. At step 151, the ports on the single S-VLAN component 132 facing the MEN 92 are designated as RCPs for management purposes if those ports are connecting the internal services in the MEN to provide a Hairpin Switching service interface to customers from the other side of the E-NNI 93. At step 152, a management action is enabled on the RCPs to configure a set of S-VIDs to be treated as R-CSI type: Hairpin Switching R-CSI service interface. At step 153, a management action is enabled on the RCPs to configure the S-VID Hairpin Switching table: the S-VID inside the MEN 92 is split to a number of S-VLAN services in the E-NNI 93. At step 154, a distinct CNP on the left S-VLAN component is assigned to each of the configured S-VIDs (configured in step 152).

At step 155, CNPs on the single S-VLAN component 132 are configured with the same VID according to the S-VID Hairpin Switching table (configured in step 153). For example, in FIG. 12, two CNPs 106 are configured as VID 6. At step 126, these CNPs on the S-VLAN component are configured to connect to other CNPs on the S-VLAN component. For example, in FIG. 12, the two CNPs 106 with VID 6 are connected to CNPs 107 with VID 2 and 3 on the same S-VLAN component. Finally, at step 157, CNPs 107 (with VID 2 and 3) and the PNP 105 facing the E-NNI 93 are configured with different S-VIDs to split the S-VID inside the MEN 92 according to the Hairpin Switching table.

It should be noted that in FIG. 9, the S-VID from the MEN and the S-VID to the E-NNI are independent, so the S-VIDs can be the same. In FIG. 12, however, since there is only one S-VLAN component, all S-VIDs in different ports must be different. S-VIDs cannot be reused.

It should also be noted that the Real Time Streaming Protocol (RTSP) cannot be used to provide R-CSI Hairpin Switching because the protocol will act as if there is a loop, and it will block one of the ports. However, the Multiple Spanning Tree Protocol (MSTP) may be utilized instead. The VIDs assigned to the outgoing services must belong to a different Multiple Spanning Tree Instance (MSTI) than the VIDs assigned to incoming services. The outgoing services are services towards PNPs facing the E-NNI, and the incoming services are services towards the RCPs.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of providing a Port-based interface in a Provider Edge Bridge, wherein the Provider Edge Bridge includes a Customer Virtual Local Area Network (C-VLAN) component having a Customer Edge Port (CEP) and a plurality of Provider Edge Ports (PEPs) and includes a first Service Virtual Local Area Network (S-VLAN) component connected to the C-VLAN component and to a Provider Bridged Network, the method comprising:
- implementing in the Provider Edge Bridge, a second S-VLAN component connected to the C-VLAN component, to the first S-VLAN component, and to customer equipments; and
- configuring the first S-VLAN component, the second S-VLAN component, and the C-VLAN component to provide the Port-based interface by:
  - designating as S-VLAN Remote Customer Ports (RCPs), a plurality of ports on the first S-VLAN component facing the Provider Bridged Network when the ports are connecting internal services in the Provider Bridged Network to provide the Port-based interface to the customer equipments;
  - configuring by the RCPs, a set of S-VLAN Identifiers (S-VIDs) to be treated as a Port-based type of Remote Customer Service Interface (R-CSI);
  - configuring by the RCPs, an S-VID Port-based interface table in which an S-VID inside the Provider Bridged Network is split to a number of S-VLAN services;
  - assigning a distinct Customer Network Port (CNP) on the first S-VLAN component to each of the configured S-VIDs;
  - configuring a plurality of CNPs on the first S-VLAN component to have the same S-VID according to the S-VID Port-based interface table;
  - configuring CNPs on the first S-VLAN component to connect to CNPs on the second S-VLAN component; and
  - configuring the CNPs and a Provider Network Port (PNP) facing the customer equipments on the second S-VLAN component with different S-VIDs to split the S-VID inside the Provider Bridged Network according to the S-VID Port-based interface table.

2. A method of providing a Port-based interface in a Provider Edge Bridge, wherein the Provider Edge Bridge includes a Customer Virtual Local Area Network (C-VLAN) component having a Customer Edge Port (CEP) and a plurality of Provider Edge Ports (PEPs), the method comprising:
- implementing in the Provider Edge Bridge, a single Service Virtual Local Area Network (S-VLAN) component connected to the C-VLAN component, to a Provider Bridged Network, and to customer equipments; and
- configuring the S-VLAN component and the C-VLAN component to provide the Port-based interface, wherein the configuring includes configuring the Provider Edge Bridge to provide the Port-based interface by:
  - designating as S-VLAN Remote Customer Ports (RCPs), a plurality of S-VLAN ports facing the Provider Bridged Network when the ports are connecting internal services in the Provider Bridged Network to provide the Port-based interface to customer equipments;
  - configuring by the RCPs, a set of S-VLAN Identifiers (S-VIDs) to be treated as a Port-based type of Remote Customer Service Interface (R-CSI);
  - configuring by the RCPs, an S-VID Port-based interface table in which an S-VID inside the Provider Bridged Network is split to a number of S-VLAN services;
  - assigning a distinct Customer Network Port (CNP) on the S-VLAN component to each of the configured S-VIDs;
  - configuring a plurality of CNPs on the S-VLAN component to have the same S-VID according to the S-VID Port-based interface table;
  - configuring CNPs on the S-VLAN component to connect to other CNPs on the same S-VLAN component; and
  - configuring the CNPs and a Provider Network Port (PNP) facing the customer equipments on the S-VLAN component with different S-VIDs to split the S-VID inside the Provider Bridged Network according to the S-VID Port-based interface table.

3. A Provider Edge Bridge for providing a Port-based interface, the Provider Edge Bridge comprising:
- a Customer Virtual Local Area Network (C-VLAN) component having a Customer Edge Port (CEP) and a plurality of Provider Edge Ports (PEPs);
- a first Service Virtual Local Area Network (S-VLAN) component connected to the C-VLAN component and to a Provider Bridged Network;
- a second S-VLAN component connected to the C-VLAN component, to the first S-VLAN component, and to customer equipments; and
- an S-VID Port-based interface table in which an S-VLAN Identifier (S-VID) inside the Provider Bridged Network is split to a number of S-VLAN services;

wherein:
- a plurality of S-VLAN ports on the first S-VLAN component facing the Provider Bridged Network are designated as S-VLAN Remote Customer Ports (RCPs) when the ports are connecting internal services in the Provider Bridged Network to provide the Port-based interface to customer equipments;
- a set of S-VIDs is configured to be treated as a Port-based type of Remote Customer Service Interface (R-CSI);
- a distinct Customer Network Port (CNP) on the first S-VLAN component is assigned to each of the configured S-VIDs;
- a plurality of CNPs on the first S-VLAN component are configured to have the same S-VID according to the S-VID Port-based interface table;
- the CNPs on the first S-VLAN component are configured to connect to CNPs on the second S-VLAN component; and
- the CNPs and a Provider Network Port (PNP) facing the customer equipments on the second S-VLAN component are configured with different S-VIDs to split the S-VID inside the Provider Bridged Network according to the S-VID Port-based interface table.

4. A Provider Edge Bridge for providing a Port-based interface, the Provider Edge Bridge comprising:
- a Customer Virtual Local Area Network (C-VLAN) component having a Customer Edge Port (CEP) and a plurality of Provider Edge Ports (PEPs);
- a Service Virtual Local Area Network (S-VLAN) component connected to the C-VLAN component (94), to a Provider Bridged Network, and to customer equipments; and
- an S-VLAN Identifier (S-VID) Port-based interface table in which an S-VID inside the Provider Bridged Network is split to a number of S-VLAN services;

wherein:
- a plurality of S-VLAN ports facing the Provider Bridged Network are designated as S-VLAN Remote Customer Ports (RCPs) when the ports are connecting internal services in the Provider Bridged Network to provide the Port-based interface to customer equipments;

a set of S-VIDs is configured to be treated as a Port-based type of Remote Customer Service Interface (R-CSI);

a distinct Customer Network Port (CNP) on the S-VLAN component is assigned to each of the configured S-VIDs;

a plurality of CNPs on the S-VLAN component are configured to have the same S-VID according to the S-VID Port-based interface table;

the CNPs on the S-VLAN component are configured to connect to other CNPs on the same S-VLAN component; and the CNPs and a Provider Network Port (PNP) facing the customer equipments on the S-VLAN component are configured with different S-VIDs to split the S-VID inside the Provider Bridged Network according to the S-VID Port-based interface table.

* * * * *

UNITED STATES PATENT AND TRADEMARK OFFICE
CERTIFICATE OF CORRECTION

PATENT NO. : 8,705,534 B2
APPLICATION NO. : 13/069748
DATED : April 22, 2014
INVENTOR(S) : Saltsidis et al.

Page 1 of 1

It is certified that error appears in the above-identified patent and that said Letters Patent is hereby corrected as shown below:

In the Drawings

In Fig. 9, Sheet 5 of 10, delete "  " and insert -- 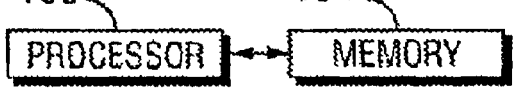 --, therefor.

In Fig. 12, Sheet 8 of 10, delete " 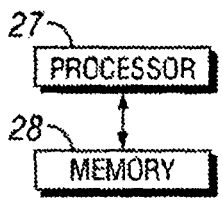 " and insert -- 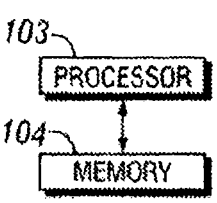 --, therefor.

In the Specification

In Column 6, Line 9, delete "operators" and insert -- operator's --, therefor.

In Column 8, Line 60, delete "GNPs" and insert -- CNPs --, therefor.

In Column 9, Line 24, delete "GNPs" and insert -- CNPs --, therefor.

In the Claims

In Column 12, Line 56, in Claim 4, delete "component (94)," and insert -- component, --, therefor.

Signed and Sealed this
Ninth Day of September, 2014

Michelle K. Lee
*Deputy Director of the United States Patent and Trademark Office*